June 19, 1962
G. A. HEALIS
3,040,232
METHOD OF REMOVING AND REPLACING INDIVIDUAL
RECTIFIER ELEMENTS AND
FUSES UNDER LOAD
Filed Nov. 9, 1960
3 Sheets-Sheet 1
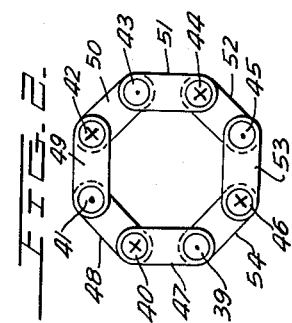
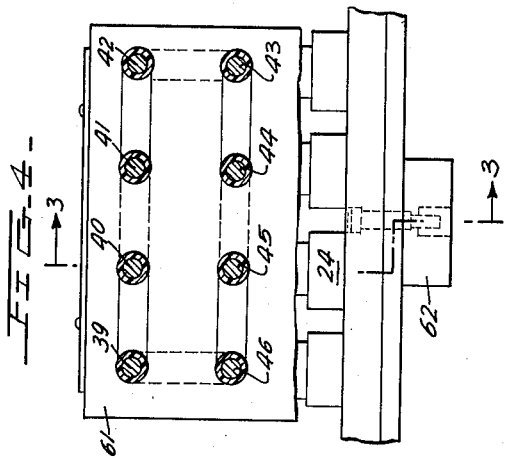
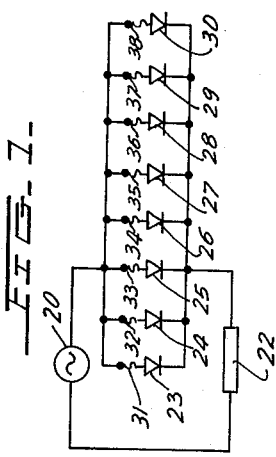
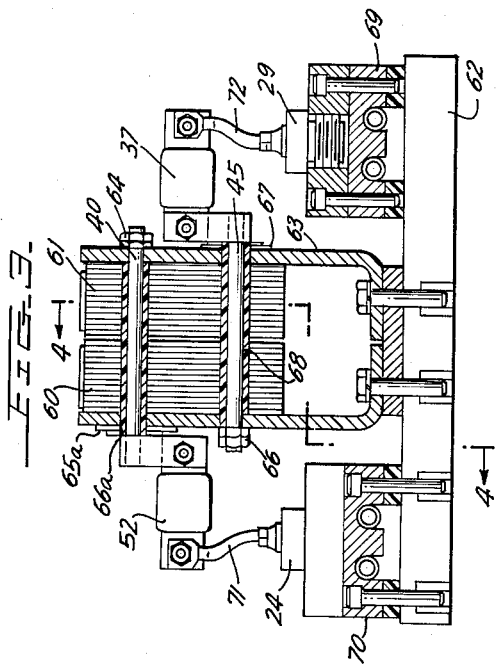
INVENTOR.
GEORGE A. HEALIS
BY
OSTROLENK, FABER, GERB & SOFFEN
ATTORNEYS

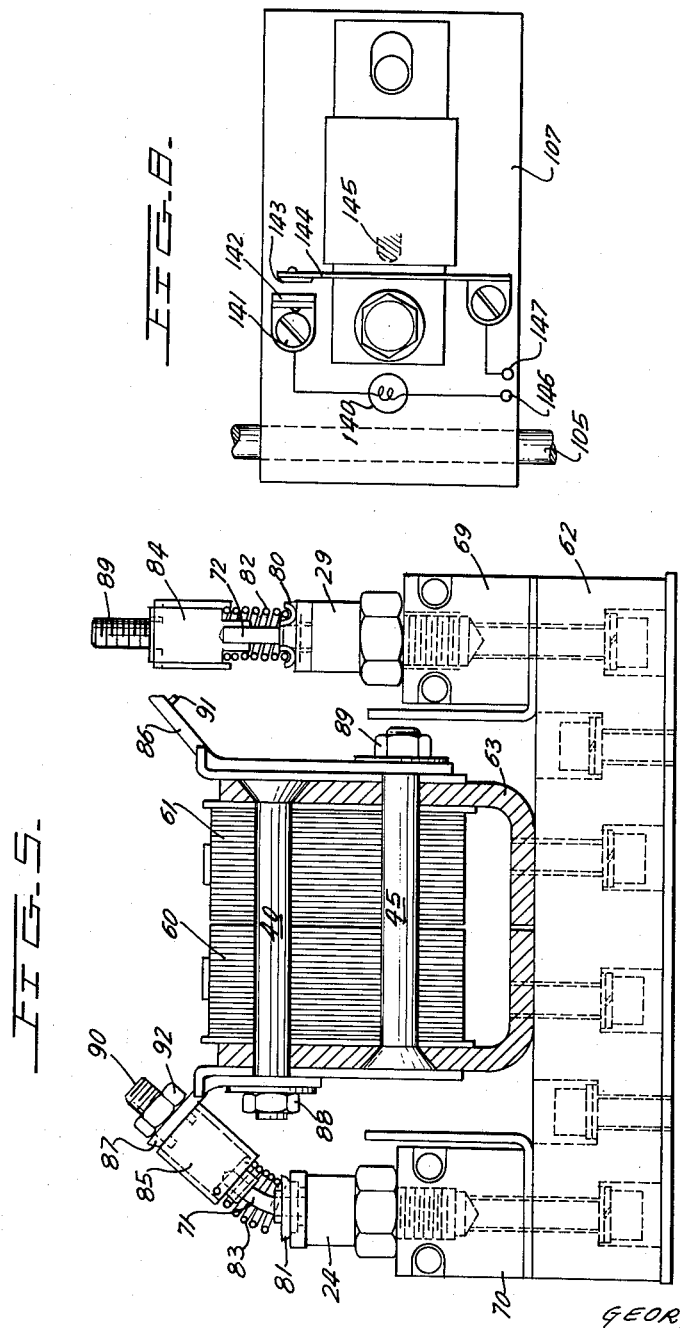

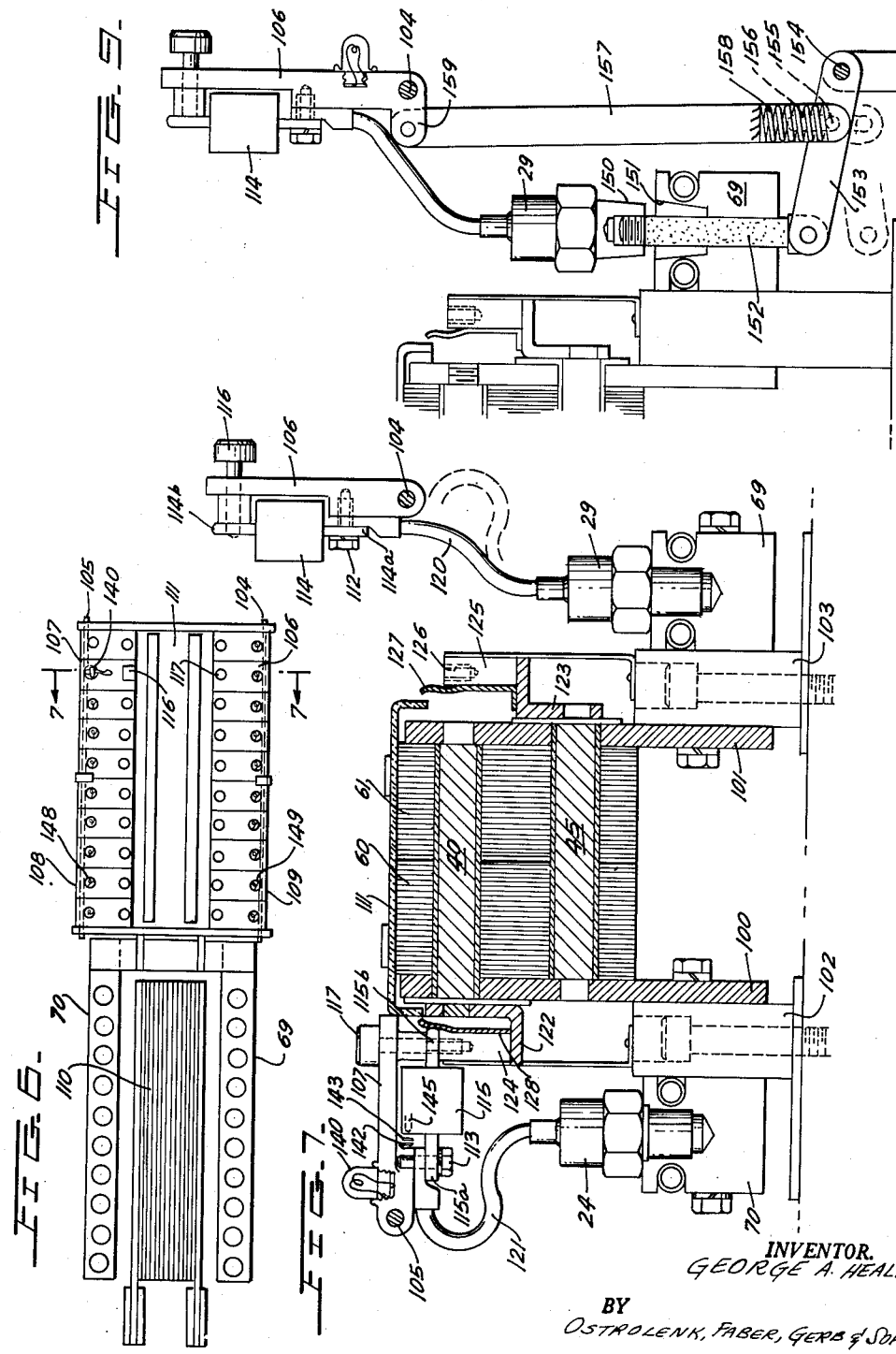

United States Patent Office 3,040,232
Patented June 19, 1962

3,040,232
METHOD OF REMOVING AND REPLACING INDIVIDUAL RECTIFIER ELEMENTS AND FUSES UNDER LOAD
George A. Healis, Lansdowne, Pa., assignor to I-T-E Circuit Breaker Company, Philadelphia, Pa., a corporation of Pennsylvania
Filed Nov. 9, 1960, Ser. No. 68,172
13 Claims. (Cl. 321—11)

This invention relates to novel rectifier systems utilizing large numbers of series and parallel connected rectifier elements wherein the rectifier elements may be safely removed and replaced under load.

Rectifier systems of the high power type utilizing a plurality of parallel connected rectifier elements are disclosed in U.S. Patent 2,945,961, issued July 19, 1960, in the name of George A. Healis, entitled "Current Balancing Reactors for Diodes," and assigned to the assignee of the present invention. As shown in that application, where a large number of parallel connected rectifier elements are to be used, it is highly desirable to provide current balancing means for balancing the current through each of the rectifier elements so that it will never carry more than its share of the total output current. Furthermore, the rectifier elements and the magnetic structure for achieving current balancing have been shown in the above noted application to be conveniently mounted by the bus system.

In the above structure, when a rectifier element fails and its series connected protective fuse operates, it is necessary to shut down the complete installation in order to replace the defective element. In large installations, even this temporary shut-down is highly disadvantages, and in some electro-chemical applications, such shut-down is virtually impossible until preselected maintenance intervals.

In accordance with the present invention, the rectifier system is so constructed that the rectifier elements and fuses may be safely removed from the system without shutting the system down, and without subjecting the individual removing and replacing the fuse to undue hazard.

Accordingly, the primary object of this invention is to provide a novel support structure for rectifier elements which permit safe removal and replacement of rectifier elements under load.

Another object of this invention is to provide a novel rectifier system construction which provides a dead-front to maintenance workers which is selectively defeatable to provide safe access to any rectifier element for removal and replacement thereof.

These and other objects of this invention will become apparent from the following description when taken in connection with the drawings, in which:

FIGURE 1 schematically illustrates a single phase half-wave rectifier system utilizing a plurality of parallel connected rectifier elements each having a respective protective fuse.

FIGURE 2 schematically illustrates the manner in which the rectifier elements of FIGURE 1 are magnetically coupled by coupling reactors to balance the current through each of the rectifier elements.

FIGURE 3 is a side cross-sectional view of a specific embodiment of the structure of FIGURES 1 and 2 wherein the couplet reactors of FIGURE 2 are replaced by laminations in the usual manner.

FIGURE 4 is a cross-sectional view of FIGURE 3 taken across the lines 4—4 of FIGURE 3.

FIGURE 5 is a side cross-sectional view similar to FIGURE 3 but modified in accordance with the present invention.

FIGURE 6 shows a full front view of one phase of a rectifier system constructed in accordance with the present invention where one-half of the dead-front has been removed.

FIGURE 7 is a side cross-sectional view of the structure of FIGURE 6 when taken across the line 7—7 of FIGURE 6, and specifically illustrates a further embodiment of the invention.

FIGURE 8 shows a front view of one panel of the dead-front of FIGURE 6 where a similar panel is provided for each rectifier element and fuse.

FIGURE 9 shows a still further embodiment of the invention.

Referring now to FIGURE 1, when an A.-C. source 20 is to energize a load 22 with very high D.-C. current, it is necessary to provide a plurality of parallel connected rectifier elements 23 through 30 to achieve these high currents. Each of rectifier elements 23 through 30 preferably are connected in series with a respective fuse such as fuses 31 through 38 where, in the event of a failure of any of rectifier elements 23 through 30, the reverse current which can then pass through the fuse is sufficient to operate it so that the faulty rectifier element is isolated from the system.

In order to balance the currents through each of the parallel connected elements, and as is disclosed in above noted U.S. Patent 2,945,961, the rectifier element conductors 39 through 46 connected in series with each of rectifier elements 23 through 30, respectively, are coupled as in a closed chain by the reactors schematically illustrated in FIGURE 2 as coupling reactors 47 through 54. Details of this construction are set forth in the above noted U.S. Patent 2,945,961, and will not be given here, it being sufficient to note that adjacent conductors are arranged to carry currents in opposite directions, as illustrated in FIGURE 2 by the conventional dot and cross symbols whereby the reactors magnetically couple adjacent conductors so that the variation in the currents passed by the adjacent conductors is limited to the magnetizing currents of the reactors.

Where the function of the coupling reactors is formed by a stamped lamination, as shown in FIGURES 3 and 4, the stamped laminations are formed in two groups 60 and 61 wherein the apertures in each group are staggered so that, for example, lamination portion 61 couples conductors 39 and 46, while lamination portion 60 couples conductors 39 and 46, while lamination portion 60 couples conductors 39 and 40.

As best shown in FIGURE 3, a common base 62 carries the U-shaped bus bar 63 which mounts the lamination groups 60 and 61. More specifically, rectifier element conductors 39 through 46 extend through openings in bus bar 63 and thence through their respective apertures, where conductors 40, 42, 44 and 46, which each carry current in the same direction, insulated from left hand side of bus bar 63, and are electrically connected to the bus bar 63 at the right-hand side, as by bolt connecting means 64.

The left-hand end of these conductors, such as conductor 40, are insulated from bus bar 63 and from the laminations 60 and 61 by insulating disk 65a and tube 66a.

In a similar manner, conductors 39, 41, 43 and 45 pass through appropriate openings in bus bar 63 and lamination groups 60 and 61, and are terminated on the left-hand side of bus bar 63, as by nut 66 for conductor 45, while the remainder of the conductor is insulated from bus bar 63 as by insulating disk 67 and tube 68.

The base 62 further serves to mount bus bars 69 and 70 which threadably receive rectifier elements, such as rectifier elements 29 which corresponds to conductor 45, and rectifier element 24 which corresponds to rectifier element conductor 40. Each of these rectifier elements, such as elements 24 and 29, are of the standard type and may be, for example, of germanium or silicon.

The extending pigtail 71 and 72 of each of rectifier elements 24 and 29 are then secured to one terminal of their respective fuses 32 and 37, which, in turn, are electrically connected to rectifier element conductors 40 and 45, respectively.

With this type of construction, as set forth in above noted U.S. Patent 2,945,961, if one of the rectifier elements such as element 24 should fail, and fuse 32 operates, it is necessary to de-energize the complete system before removing and replacing the rectifier and fuse, since the removal under load would be extremely hazardous.

In accordance with the present invention, the system is constructed in such a manner that insulated tools may be easily brought into play to loosen a single securing means, whereupon the circuit including the rectifier and fuse which has failed is automatically ejected from its energized position, as by spring carrying means, to render one point of potential of the circuit remote so that an insulated tool may thereafter simply remove the faulty circuit. Thereafter, and by the same tool, a new system may be placed into position and brought into connection with the remote point of potential in a simplified manner.

The novel mounting structure of the present invention is shown in a preferred embodiment in FIGURE 5.

Referring now to FIGURE 5, I have shown the mounting base 62 which carries the bus 63 which, in turn, supports lamination portions 60 and 61. As shown in FIGURE 3, insulated pairs of rectifier elements pass through lamination portions 60 and 61 in opposite directions, as illustrated for conductors 40 and 45 where element 40 is electrically connected to the right-hand side of bus 63, while conductor 45 is electrically secured to the left-hand side of bus 63.

Extending bus bars 69 and 70 which are carried by base 62 receive the rectifier elements in the usual manner as by threading, as shown for rectifier elements 29 and 24 respectively.

The upper end of the rectifier elements 24 and 29 carry caps such as caps 80 and 81 which have springs such as beryllium springs 82 and 83 respectively secured thereto. The pigtails 71 and 72 of rectifier elements 24 and 29 respectively extend through the center of springs 83 and 82 respectively, and are electrically terminated on one end of fuses 84 and 85 respectively. The fuses 84 and 85 are further adapted to have the upper end of springs 82 and 83 rigidly secured thereto.

Accordingly, and as shown in FIGURE 5, the fuses such as fuses 84 and 85 are electrically connected to their respective rectifier elements, but are mechanically movable on the spring mounting formed by springs, such as springs 82 and 83.

The bus 63 then supports bifurcated connecting elements 86 and 87 which may be connected to bus 63 by bolt elements such as nuts 88 and 89 which secure conductive studs 40 and 45 in position. The position of bifurcated elements 86 and 87 is such that the extending conductive studs 89 and 90 which form the output terminal of fuses 84 and 85 respectively may be bent directly into the bifurcated element until a projecting prong such as prong 91 for bifurcated element 86 slips over the outer drum surface of the fuse such as fuse 84. A fastening means such as nut 92 for stud 90 may then be secured in position to retain fuse 85 in the connected position shown in FIGURE 5.

In the event that a rectifier element should fail and it is necessary to remove and replace this rectifier element, in accordance with the present invention, an insulated wrench is placed over the nut, such as nut 92 and nut 92 is loosened several turns on stud 90. Thereafter, the fuse assembly may be depressed below the projecting tongue of bifurcated member 87 so that spring 83 will now move the fuse 85 to an upright position which is remote from the point of potential at bifurcated member 87. This removed position is shown for fuse 84 in FIGURE 5. Thereafter, a second insulated wrench may be brought down over the entire assembly and onto the hexhead of the fuse 24 to remove it from bus 70 in a safe manner, even though the unit is continuously energized. A new combined fuse and rectifier element assembly may thereafter be placed in position in a manner reverse to the above described operation.

FIGURES 6, 7 and 8 illustrate a second embodiment of the invention wherein the fuse connected in series with the rectifier element is carried from a hinged panel rather than from a spring, as in FIGURE 5 wherein the hinged panels define a dead-front board for the rectifier unit.

Referring now to FIGURES 6 and 7, it will be seen that the bus structure and manner of support thereof differs slightly from FIGURE 5 in that the bus 63 of FIGURE 5 is made from two straight buses 100 and 101 which are carried from insulating support posts 102 and 103 respectively which are, in turn, secured to some mounting frame.

The bus bars 69 and 70 are then supported on the outer sides of supports 103 and 102 in the manner shown, and as has been described in FIGURE 5, bus bars 69 and 70 have tapped holes (see FIGURE 6) for receiving the rectifier elements, such as rectifiers 24 and 29 in threaded relation.

A first and second pivotal mounting bar 104 and 105 then pivotally carry a plurality of insulating panels, such as insulating panels 106, 107 (FIGURE 7), 108 and 109 (FIGURE 6). The insulating panels, when in the closed position, appear as shown in the right-hand side of FIGURE 6. An enlarged view of insulating panel 107 is shown in FIGURE 8.

The insulating panels for the left-hand side of FIGURE 6 have been removed to illustrate the bus work including bus bars 69 and 70, and the current balancing laminations 110 more specifically seen in FIGURE 7 as including lamination portions 60 and 61.

The top lamination portions 60 and 61 has an insulating sheet 111 secured thereacross so that, as best seen in FIGURE 6, sheet 111 and the panels above and below sheet 111 define an absolute dead-front assembly.

The insulating panels 106 and 107 are provided with securing means such as bolts 112 and 113 respectively for securing fuses 114 and 115 thereto respectively at the extending blades 114a and 115a of the fuses 114 and 115 respectively.

The blades 114b and 115b extending from the opposite ends of the fuses 114 and 115 respectively have openings therein for receiving bolts 116 and 117 respectively which are externally accessible from the front of the panel, as shown in FIGURE 6.

The bolts 112 and 113 further serve to secure pigtails 120 and 121 extending from rectifier elements 29 and 24 respectively to fuses 114 and 115 respectively, so that each of the rectifier elements of the system will be connected in series with a respective fuse.

The conductors 40 and 45 extending through the laminations 60 and 61 are terminated with conductive flanges 122 and 123 respectively which carry conductive blocks 124 and 125 respectively. Each of the conductive blocks has a tapped opening therein such as tapped opening 126 to receive the threaded end of their respective securing bolt carried by their respective panel, such as bolt 116 which is threadably received by tapped opening 126.

A resilient arcing finger is also carried from the conductive flange members such as arcing fingers 127 and 128 for flanges 123 and 124 respectively. These arcing fingers will engage the outer fuse extension when the fuse carrying panel is initially brought into engagement with its respective conductive block, such as blocks 124 or 125 to prevent arcing from the fuse conductor to the conductive block.

The use of the novel dead-front structure of FIGURE 6 and 7 proceeds in a manner substantially similar to that of FIGURE 5. Generally, the current path of the rectifier unit is completed from the rectifier cell such as rectifier cell 24, through its fuse 115, to block 124, through the flange 122 to the conductor 40 and thence to bus 101. When the rectifier element such as rectifier element 24 fails, and its fuse 115 operates, in order to replace the unit, the operator merely loosens bolt 117 and swings panel 107 counterclockwise about pivot point 105 to the upright position shown for panel 106. The bolt 113 is then removed, and the fuse 115 is removed from panel 107.

An insulating wrench is then slipped over pigtail 121 and rectifier element 24, and the element is removed. A new unit is then replaced in bus 70 by a procedure which is reverse to the aforementioned procedure.

Once a new rectifier element is connected in place and a new fuse such as fuse 115 is secured to panel 107, the panel 107 is rotated clockwise about its pivot 105, and is swung down to the position shown in FIGURE 7.

It will be noted that the end of the fuse terminal will strike flexible arcing contact 128 before the fuse terminal engages securing block 124 so that any arcing that occurs will occur from the fuse terminal to the arcing contact 128, rather than to the mounting block 124. Thus, mounting block 124 will not be pitted by arcing, and low resistance contact can be made between mounting block 124 and the fuse terminal.

If desired, the insulating panels can be modified for use with fuses that eject a striker pin responsive to their operation so that a bulb carried by the panel will be energized responsive to the operation of the fuse. This modification is incorporated into panel 107 of FIGURE 7 and is shown in enlarged view in FIGURE 8.

More specifically, a bulb 140 is threaded into a socket in panel 107, as illustrated in FIGURE 7. The bulb 140 is schematically illustrated in FIGURE 8 as being contained in an electrical circuit which includes a terminal 141 secured to the stationary contact 142 of a switching device which includes a movable contact 143 carried on contact arm 144. The fuse 115, as seen in FIGURE 7, has an ejectable striker pin 145 of well known construction which is ejected beyond the surface of the fuse when the fuse is operated. This striker pin is aligned with contact arm 144, as illustrated in FIGURE 8, so that when it is operated, it will move contact arm 144 and its contact 143 into engagement with stationary contact 142.

This operation will complete a circuit of terminals 146 and 147 which may have some auxiliary voltage source thereacross. If desired, the voltage source for driving bulb 140 could include the voltage across the fuse after the fuse is operated.

In FIGURE 6 I have illustrated the panels as each being provided with an indicating lamp such as lamp 140. By way of example, panels 108 and 109 are provided with indicating lamps 148 and 149 respectively. The advantage of such a configuration is that while a maintenance worker may know that a fuse has been operated by observing the position of its striker pin, when the dead-front arrangement of FIGURES 6 and 7 is used, these striker pins will not be visually accessible. Obviously, the use of the indicating lamp will immediately inform the maintenance worker of the position of the faulty rectifier element, or it could also be used to inform him of the failure of the rectifier element, and thus be usable as an alarm system.

FIGURE 9 illustrates a possible modification of the dead-front panel arrangement of FIGURES 6 and 7 wherein the rectifier elements removably engage the bus bars such as bus bars 69 and 70 along a smooth conical surface. Thus, in FIGURE 9, I have illustrated rectifier element 29 as having a conically tapered surface 150 which is smooth and engages a conical opening 151 in bus bar 69 which is also smooth and has a shape which cooperates with the conical shape of surface 150.

An operating linkage is then provided for lifting recti-fier element 29 out of the bus 69 when the panel 106 is raised so that positive isolation of rectifier element 29 and fuse 114 is obtained when panel 106 is raised.

The operating linkage includes a link 152 of insulating material which passes through an opening in bus bar 69, and terminates on the bottom of rectifier element 29. The lower end of link 152 is pivotally connected to link 153 which is mounted on a fixed pivot pin 154 which is carried from some stationary portion of the assembly frame.

A mid-portion of link 154 has a pin 155 extending therefrom which engages a slot 156 in link 157. The link 157 further carries a compression spring 158 which has its upper end fixed to link 157 and its lower end bearing upon pin 155. The upper end of link 157 is pivotally connected to an extending crank arm 159 of panel 106.

In operating, when panel 106 is closed, link 153 will be moved downwardly to the dotted line position so that conical surface 150 engages conical surface 151 of bus bar 69 in a rigid electrical engagement under the influence of spring 158. When, however, panel 106 is raised to the position shown in FIGURE 9, link 157 will pull link 153 upwardly in a clockwise direction to move link 152 upwardly, and thus remove rectifier element 29 from its engaged position with bus bar 69 to the position shown. Once this is achieved, there will be positive isolation between the bar bar 69 and the rectifier element 29 and its fuse 114.

Although this invention has been described with respect to its preferred embodiments it should be understood that many variations and modifications will now be obvious to those skilled in the art, and it is preferred, therefore, that the scope of this invention be limited not by the specific disclosure herein but only by the appended claims.

What is claimed is:

1. A mounting arrangement for a series connected diode and a fuse; said diode having a first and second terminal; said fuse having a first and second terminal; said first terminal of said diode being removably secured to a first bus conductor; said second terminal of said diode being connected to said first terminal of said fuse by flexible connecting means; said second terminal of said fuse being rigidly engageable with respect to a second bus bar; said first and second bus bars being at different potentials; a mounting means; one end of said mounting means being connected to said fuse; the other end of said mounting means being secured stationary with respect to said fuse; said one end of said mounting means being rotatable to rotate said fuse to bring its said second terminal out of engagement with respect to said second bus bar and to a position removed from said second bus bar whereby said first terminal of said diode can be removed from said first bus bar by tool means spaced from said second bus bar.

2. The device substantially as set forth in claim 1 wherein a plurality of series connected diodes and fuses are provided with respective mounting means; each of said series connected diodes and fuses being connected in parallel between said first and second bus bars.

3. A mounting arrangement for a series connected diode and a fuse; said diode having a first and second terminal; said fuse having a first and second terminal; said first terminal of said diode being removably secured to a first bus conductor; said second terminal of said diode being connected to said first terminal of said fuse by flexible connecting means; said second terminal of said fuse being rigidly engageable with respect to second bus bar; said first and second bus bars being at different potentials; a mounting means connected; one end of said mounting means being connected to said fuse; the other end of said mounting means being secured stationary with respect to said fuse; said one end of said mounting means being rotatable to rotate said fuse to bring its said second terminal out of engagement with respect to said second bus bar and to a position removed from said second bus bar whereby said first terminal of said diode can be removed from said first bus bar by tool means spaced from said second bus bar; said mounting means including a resilient means having a first end connected to said fuse adjacent said first terminal of said fuse and a second end rigidly connected to said diode.

4. A mounting arrangement for a series connected diode and a fuse; said diode having a first and second terminal; said fuse having a first and second terminal; said first terminal or said diode being rigidly engageable with respect to a first bus conductor; said second terminal of said diode being connected to said first terminal of said fuse by flexible connecting means; said second terminal of said fuse being rigidly engageable with respect to a second bus bar; said first and second bus bars being at different potentials; a mounting means connected to said fuse; said mounting means being rotatable to rotate said fuse to bring its said second terminal out of engagement with respect to said second bus bar and to a position removed from said second bus bar whereby said first terminal of said diode can be removed from said first bus bar by tool means spaced from said second bus bar; said mounting means including a resilient means having a first end connected to said fuse adjacent said first terminal of said fuse and a second end rigidly connected to said diode; said resilient means being distorted when said second terminal of said fuse engages said second bus bar.

5. A mounting arrangement for a series connected diode and a fuse; said diode having a first and second terminal; said fuse having a first and second terminal; said first terminal of said diode being rigidly engageable with respect to a first bus conductor; said second terminal of said diode being connected to said first terminal of said fuse by flexible connecting means; said second terminal of said fuse being rigidly engageable with respect to a second bus bar; said first and second bus bars being at different potentials; a mounting means connected to said fuse; said mounting means being rotatable to rotate said fuse to bring its said second terminal out of engagement with respect to said second bus bar and to a position removed from said second bus bar whereby said first terminal of said diode can be removed from said first bus bar by tool means spaced from said second bus bar; said mounting means including a pivotally mounted insulating panel pivotally mounted at a point adjacent said first terminal of said fuse.

6. A mounting arrangement for a series connected diode and a fuse; said diode having a first and second terminal; said fuse having a first and second terminal; said first terminal of said diode being rigidly engageable with respect to a first bus conductor; said second terminal of said diode being connected to said first terminal of said fuse by flexible connecting means; said second terminal of said fuse being rigidly engageable with respect to a second bus bar; said first and second bus bars being at different potentials; a mounting means connected to said fuse; said mounting means being rotatable to rotate said fuse to bring its said second terminal out of engagement with respect to said second bus bar and to a position removed from said second bus bar whereby said first terminal of said diode can be removed from said first bus bar by tool means spaced from said second bus bar; said mounting means including a pivotally mounted insulating panel pivotally mounted at a point adjacent said first terminal of said fuse; said pivotally mounted insulating panel completing a dead front panel when rotated to the position in which said second terminal of said fuse engages said second bus bar.

7. The device substantially as set forth in claim 6 wherein a plurality of series connected diodes and fuses are provided with respective mounting means; each of said series connected diodes and fuses being connected in parallel between said first and second bus bars; said dead front panel being at least partially formed by the insulating panels of each of said fuses.

8. A mounting arrangement for a series connected diode and a fuse; said diode having a first and second terminal; said fuse having a first and second terminal; said first terminal of said diode being rigidly engageable with respect to a first bus conductor; said second terminal of said diode being connected to said first terminal of said fuse by flexible connecting means; said second terminal of said fuse being rigidly engageable with respect to a second bus bar; said first and second bus bars being at different potentials; a mounting means connected to said fuse; said mounting means being rotatable to rotate said fuse to bring its said second terminal out of engagement with respect to said second bus bar and to a position removed from said second bus bar whereby said first terminal of said diode can be removed from said first bus bar by tool means spaced from said second bus bar; said mounting means including a pivotally mounted insulating panel pivotally mounted at a point adjacent said first terminal of said fuse; said pivotally mounted insulating panel completing a dead front panel when rotated to the position in which said second terminal of said fuse engages said second bus bar; said insulating panel providing access to said fuse and said diode through said dead front panel when rotated to said position to remove said second terminal of said fuse from said second bus bar.

9. A mounting arrangement for a series connected diode and a fuse; said diode having a first and second terminal; said fuse having a first and second terminal; said first terminal of said diode being rigidly engageable with respect to a first bus conductor; said second terminal of said diode being connected to said first terminal of said fuse by flexible connecting means; said second terminal of said fuse being rigidly engageable with respect to a second bus bar; said first and second bus bars being at different potentials; a mounting means connected to said fuse; said mounting means being rotatable to rotate said fuse to bring its said second terminal out of engagement with respect to said second bus bar and to a position removed from said second bus bar whereby said first terminal of said diode can be removed from said first bus bar by tool means spaced from said second bus bar; said mounting means including a pivotally mounted insulating panel pivotally mounted at a point adjacent said first terminal of said fuse; an energizable indicator means on said insulated panel; said indicator means being connected to said fuse; said indicator means being energized responsive to operation of said fuse.

10. A mounting arrangement for a series connected diode and a fuse; said diode having a first and second terminal; said fuse having a first and second terminal; said first terminal of said diode being removably secured to a first bus conductor; said second terminal of said diode being connected to said first terminal of said fuse by flexible connecting means; said second terminal of said fuse being rigidly engageable with respect to a second bus bar; said first and second bus bars being at different potentials; a mounting means, one end of said mounting means being connected to said fuse; the other end of said mounting means being secured stationary with respect to said fuse; said one end of said mounting means being rotatable to rotate said fuse to bring its said second terminal out of engagement with respect to said second bus bar and to a position removed from said second bus bar whereby said first terminal of said diode can be removed from said first bus bar by tool means spaced from said second bus bar; said removable securing between said first terminal of said diode and said first bus bar being formed by a threaded engagement.

11. A mounting arrangement for a series connected diode and a fuse; said diode having a first and second terminal; said fuse having a first and second terminal; said first terminal of said diode being rigidly engageable with respect to a first bus conductor; said second terminal of said diode being connected to said first terminal of said fuse by flexible connecting means; said second terminal of said fuse being rigidly engageable with respect to a second bus bar; said first and second bus bars being at different potentials; a mounting means connected to said fuse; said mounting means being rotatable to rotate said fuse to bring its said second terminal out of engagement with respect to said second bus bar and to a position removed from said second bus bar whereby said first terminal of said diode can be removed from said first bus bar by tool means spaced from said second bus bar; said mounting means including a pivotally mounted insulating panel pivotally mounted at a point adjacent said first terminal of said fuse; an energizable indicator means on said insulated panel; said indicator means being connected to said fuse; said indicator means being energized responsive to operation of said fuse; said tool means comprising a hollow insulated tool operable to receive said fuse, said flexible conductor and said diode to threadably remove said first terminal of said diode from said first bus bar.

12. A mounting arrangement for a series connected diode and a fuse; said diode having a first and second terminal; said fuse having a first and second terminal; said first terminal of said diode being rigidly engageable with respect to a first bus conductor; said second terminal of said diode being connected to said first terminal of said fuse by flexible connecting means; said second terminal of said fuse being rigidly engageable with respect to a second bus bar; said first and second bus bars being at different potentials; a mounting means connected to said fuse; said mounting means being rotatable to rotate said fuse to bring its said second terminal out of engagement with respect to said second bus bar and to a position removed from said second bus bar whereby said first terminal of said diode can be removed from said first bus bar by tool means spaced from said second bus bar; said mounting means including a spring having a first end connected to said fuse adjacent said first terminal of said fuse and a second end rigidly connected to said diode; said spring being distorted when said second terminal of said fuse engages said second bus bar; said second bus bar having a bifurcated conductor extending therefrom; said second terminal of said fuse being threaded; said threaded second terminal of said fuse being movable into said bifurcated conductor and being securable therein by nut means.

13. A mounting arrangement for a series connected diode and a fuse; said diode having a first and second terminal; said fuse having a first and second terminal; said first terminal of said diode being rigidly engageable with respect to a first bus conductor; said second terminal of said diode being connected to said first terminal of said fuse by flexible connecting means; said second terminal of said fuse being rigidly engageable with respect to a second bus bar; said first and second bus bars being at different potentials; a mounting means connected to said fuse; said mounting means being rotatable to rotate said fuse to bring its said second terminal out of engagement with respect to said second bus bar and to a position removed from said second bus bar whereby said first terminal of said diode can be removed from said first bus bar by tool means spaced from said second bus bar; said mounting means including a pivotally mounted insulating panel pivotally mounted at a point adjacent said first terminal of said fuse; and a linkage means extending from said panel to said diode; rotation of said panel causing said diode to be moved out of engagement with respect to said first bus bar.

No references cited.